[11] 3,578,975

[72] Inventor  Chester C. Wheeler
                Altadena, Calif.
[21] Appl. No. 737,181
[22] Filed     June 14, 1968
[45] Patented  May 18, 1971
[73] Assignee  The Perkin-Elmer Corporation
                Norwalk, Conn.

[54] APPARATUS FOR MONITORING THE GUIDANCE AND FOCUS OF TELESCOPE
6 Claims, 4 Drawing Figs.

[52] U.S. Cl. ................................................. 250/203,
                              250/201, 250/208, 356/126
[51] Int. Cl. ................................................ G01b 9/00,
                                                              G01j 1/26
[50] Field of Search ....................................... 250/201,
         202, 203, 208, 215, 234; 356/122, 123, 124, 125,
                                                126; 95/44

[56]              References Cited
              UNITED STATES PATENTS
2,513,367   7/1950   Scott .......................... 250/203
2,958,783   11/1960  Taylor ......................... 250/203

FOREIGN PATENTS
1,103,050   3/1961   Germany .................... 356/126
              OTHER REFERENCES
Barnard et al., " Digital Laser Ranging and Tracking Using a Compound Axis Servomechanism" Applied Optics, April 1966 Vol. 5, No. 4, Pgs. 497— 505

*Primary Examiner*—John Kominski
*Assistant Examiner*—E. R. LaRoche
*Attorney*—Edward R. Hyde, Jr.

ABSTRACT: Guiding and focusing errors in a stellar telescope are detected automatically using photoelectric techniques. Light from a guidestar, collected by the telescope, is directed out of the telescope as a converging focusable beam and impinges on a high-speed chopping element. Guiding errors are detected by measuring the intensity of the emerging chopped light. An AC component in the output signal indicates an error. Focusing errors are detected by measuring the intensity of the emerging chopped light after it strikes and is partly blocked by a knife edge positioned where the focus should occur. An AC component in the output signal indicates an error. Both output signals are either read on meters or fed into servosystems which move portions of the telescope to compensate for the errors.

Patented May 18, 1971
3,578,975
2 Sheets-Sheet 1
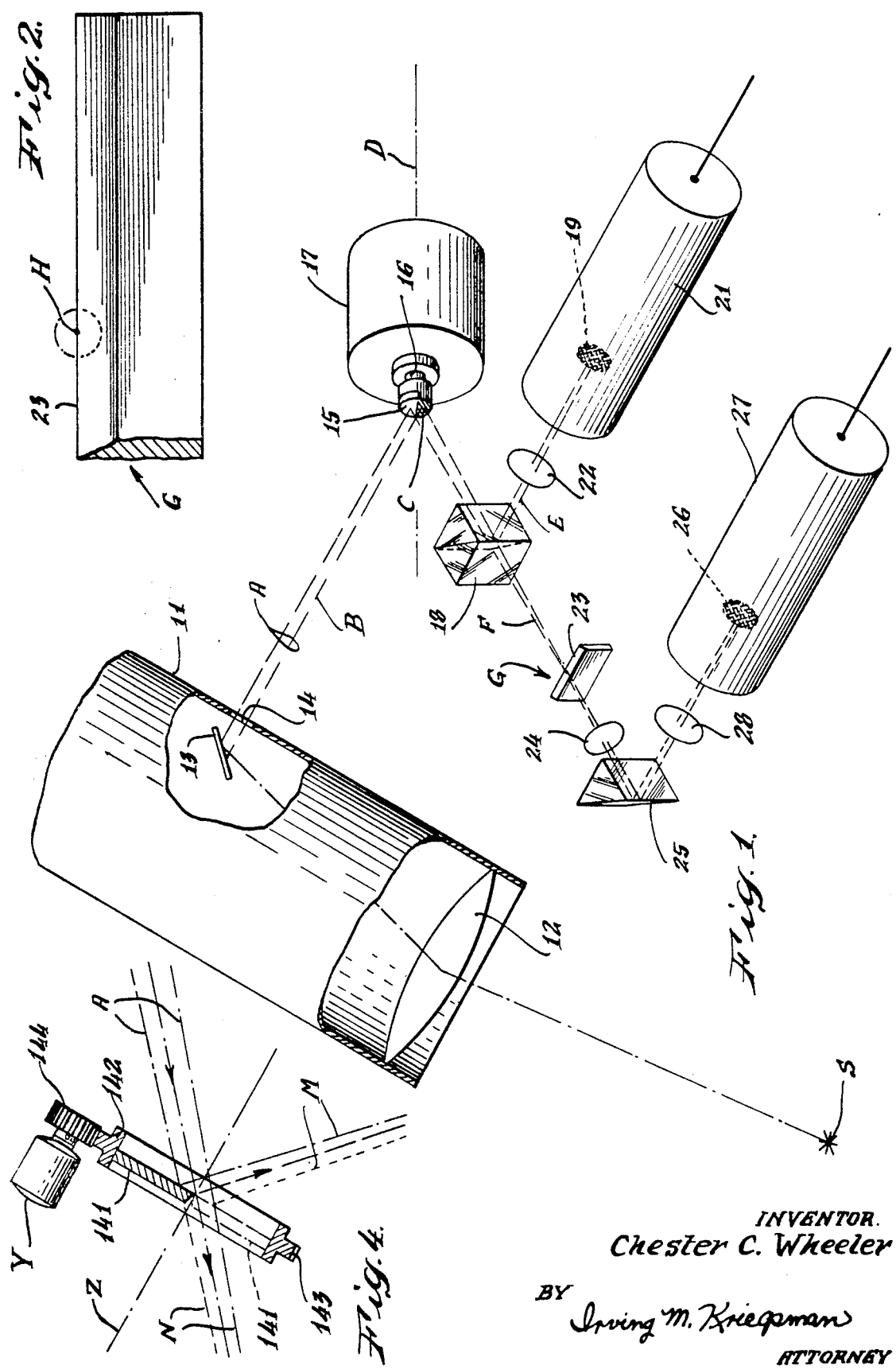
INVENTOR.
Chester C. Wheeler
BY
Irving M. Kriegsman
ATTORNEY

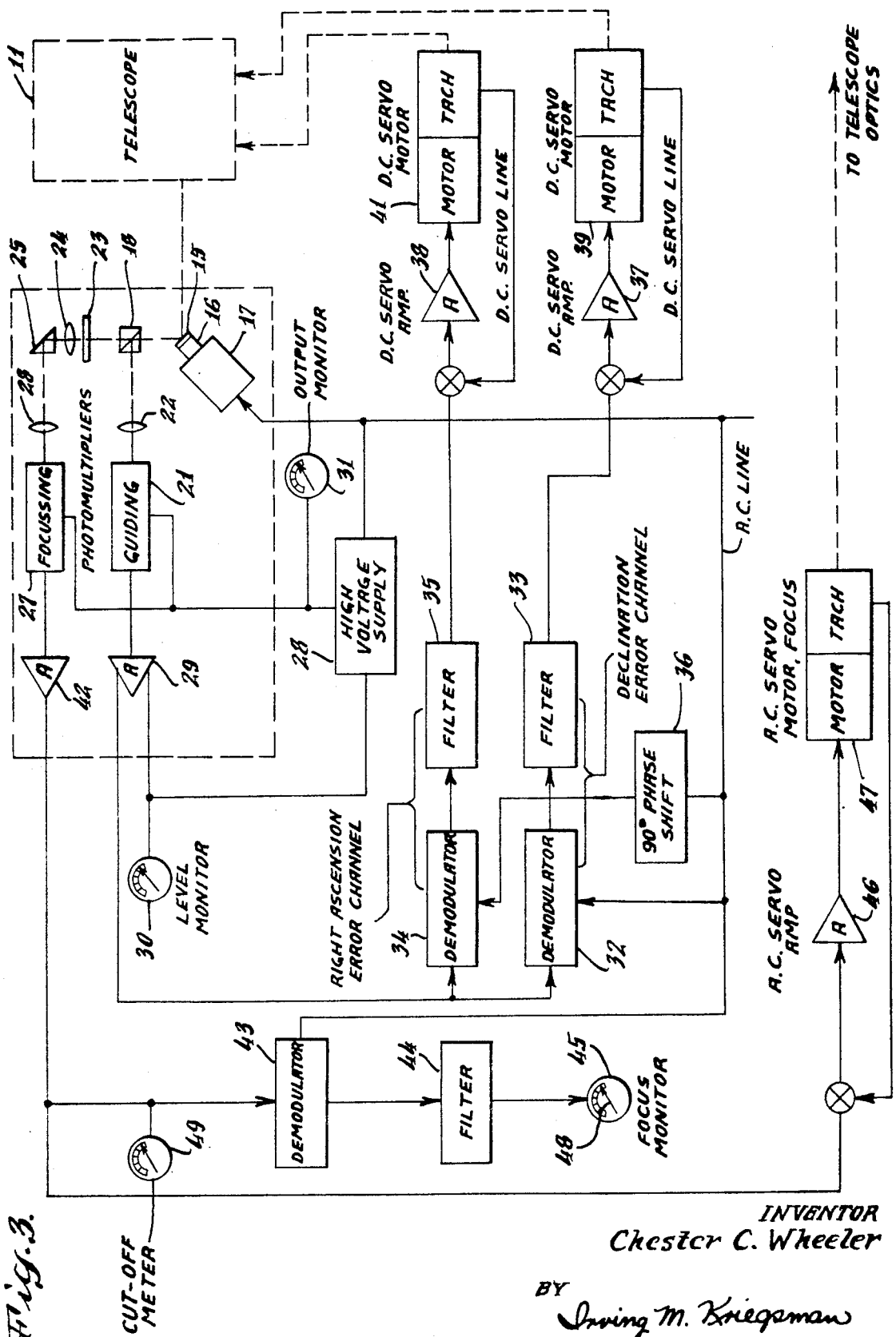

APPARATUS FOR MONITORING THE GUIDANCE AND FOCUS OF TELESCOPE

This invention relates to guiding and focusing apparatus. More particularly, this invention relates to apparatus for guiding and focusing stellar telescopes and other optical instruments in which an image is formed of a small object.

Since the introduction of photography into astronomy, it has been necessary for the astronomer to monitor telescopes for guiding and focus changes that might occur during the time in which a star or field of stars is being imaged. Guiding errors may result, for example, from changes in atmospheric refraction. Focusing errors may result, for example, from changes in the temperature of the optics or the telescope mount. Originally, guiding errors were detected and corrected manually by centering the crosshairs of an eyepiece on the telescope on the image of a reference star and then moving the telescope to compensate for any movement of the image. Although this technique was generally satisfactory it was found to be time consuming and subject to human errors. Focus errors were also monitored manually using a technique known as the Focault knife-edge test. One limitation of this technique however, was that it could not be performed during exposure. More recently automatic techniques have been proposed for automatically detecting these errors. Some of the pertinent published material is as follows:

1. A book entitled "Telescopes" edited by G. P. Kuper and B. M. Middlehurst, University of Chicago Press, pp. 75—76;
2. A book entitled "Tools of the Astronomer" authored by G. R. Miczaika and W. M. Sinton, Harvard University Press, 1961, pp. 132—134;
3. A magazine entitled "Sky and telescope," Jan. 1968 issue, pp. 22—24.

It is an object of this invention to provide a new and improved guiding and focusing apparatus.

It is another object of this invention to provide a new and improved apparatus for automatically detecting guiding and focusing errors in a stellar telescope.

It is still another object of this invention to provide a new and improved apparatus for automatically detecting and correcting guiding and focusing errors in a stellar telescope.

It is yet still another object of this invention to provide an apparatus for simultaneously detecting guiding and focusing errors in a stellar telescope and providing error signals related to the magnitude and direction of the errors.

It is another object of this invention to provide a new and improved technique for photoelectrically sensing focus errors in a stellar telescope.

It is still another object of this invention to provide a new and improved apparatus for automatically sensing and correcting guiding errors in a telescope.

The above and other objects are achieved by means of an apparatus constructed according to this invention. Basically the apparatus includes a system for monitoring guiding errors and a system for monitoring focusing errors. In some embodiments certain component parts are common to and shared by both systems.

Briefly, the technique for detecting guiding errors involves measuring the intensity of a converging focusable beam of light after it is acted on by a high-speed chopping element. The light measured is either the beam reflected by the chopping element or the beam passed by the chopping element. The technique for detecting focusing errors involves measuring The intensity of a converging focusable beam of light after it is acted on by a high-speed chopping element (as in the guiding arrangement) and then intercepted by a stationary knife positioned where the chopped beam should, in the absence of focus errors, come to focus. The converging focusable beam for both systems constitutes light collected from a star by the telescope optics.

In each system the intensity of the light measured is converted into an electrical signal. In each system, the zero error signal output is a constant DC signal. In each system an error or change produces an AC signal superimposed on the DC signal in which the magnitude of the AC component indicates the magnitude of the error and the phase of the AC component is related to the direction of the error. The output signals are either read on meters or used to servo drive the telescope to compensate for the errors.

One feature of the invention involves the construction of the chopping element. Other features involve the location and technique for turning the chopping element. Other features involve the overall technique for sensing guiding errors and the overall technique for sensing focusing errors.

Other features and many attendant advantages of the invention will become apparent on reading the following detailed description when taken in connection with the accompanying drawings wherein like reference numerals and letters represent like parts and wherein:

FIG. 1 is a combination perspective and plan view of the optical portion of one embodiment of the invention;

FIG. 2 is an enlarged plan view of the knife edge and beam spot in FIG. 1;

FIG. 3 is a schematic and block diagram view of the entire apparatus in one embodiment including the optical portion in FIG. 1; and FIG. 4 is a section view of a portion of another embodiment of the invention.

Referring now to the drawings, there is shown in FIG. 1 a stellar telescope 11. The telescope 11 includes an image-forming optical system which may either be reflective, refractive or a combination. For simplicity, the system is shown as a single lens 12. Light from a guidestar S, which is preferably outside the field of view being examined or photographed is collected by the lens 12 and transmitted as a converging focusable beam of light A. Before the beam comes to focus it is deflected by a mirror 13 and emerges from the telescope 11 through an opening 14.

Positioned along the path of the emerging light beam A is a chopping element in the form of a semicircular mirror 15. The mirror 15 is mounted directly on the end of the output shaft 16 of a high-speed permanent magnet synchronous motor 17. The mirror 15 is disposed in a plane at an angle other than normal to the principal axis B of the light beam A and rotates about its geometrical center C. When the telescope 11 is aligned, the principal axis B of light beam A intersects the axis of rotation D of the mirror 15. The end portion of output shaft 16 not covered by the mirror 15 is preferably antireflection coated or shaped in such a manner that light striking it will either be absorbed or deflected out of the system.

The light beam reflected by the mirror 15 passes through a beamsplitter 18 where it is divided into two beams E and F which emerge along different paths. One of the beams E is used for sensing guiding errors and the other beam F is used for sensing focusing errors.

Beam E impinges on the photocathode 19 of a photomultiplier tube 21. A lens 22, positioned in front of the photomultiplier tube 21, images the mirror 15 on the photocathode 19, so that the light strikes the photocathode 19 over an enlarged area.

The other beam F impinges on a knife edge 23 (FIG. 2) which is disposed in a plane G at which the focus should occur if the focus is proper. The knife edge is positioned so that it passes through the center H of the beam spot. Thus, the knife edge intercepts one half of the light beam F and allows the other half to pass. Means, such as a thumbscrew, (not shown) are provided for adjustably moving the knife edge 23 into or out of the beam spot. Light passed by the knife edge 23 is collected by a lens 24 and then reflected by a prism 25 onto the photocathode 26 of a photomultiplier tube 27.

Any alignment changes (guiding errors) in the telescope 11 will result in an axial shift in beam A. Any changes in the focus (focus error) will cause beam to come to focus either in front of or behind the knife edge 23.

The apparatus operates as follows.

When the telescope 11 is properly aligned, the principal axis B of light beam A intersects the axis of rotation D of chopping mirror 15. Thus, as the mirror 15 turns the amount of light reflected onto the photocathode 19 does not change. Accordingly, the output of photomultiplier tube 21 is a constant DC signal. However, when misalignment occurs, axes B and D do not intersect each other. Thus, the amount of light reflected by mirror 15 rather than being uniform, varies cyclically. This produces an AC signal in addition to the DC signal in the output of the photomultiplier tube 21. The magnitude of this AC component is directly related to the magnitude of the guiding error and the phase angle of this AC component is directly related to the direction of the guiding error.

Because the chopping mirror 15 is located in front of the focus, the size of the beam impinging on it is relatively large and the system is operative over a relatively large range of errors.

As will be later explained, the focus error sensing portion of the apparatus requires that there be no guiding errors. Accordingly, assuming the telescope is aligned as the mirror 15 turns, the amount of light passing the knife edge 23 and striking the photocathode 26 does not change and the output of photomultiplier tube 27 is a constant DC signal. Any change in focus will cause the beam F to come to focus either in front of or behind the knife edge 23. Thus, the light passed by the knife edge will not be uniform but will vary cyclically. This produces an AC component in addition to the DC component in the output of photomultiplier tube 27. The phase and magnitude of this signal are directly related to the direction and magnitude, respectively, of the focus error.

As can be seen in FIG. 3, an AC line supplies power to the synchronous motor 17 which is directly coupled to the chopping mirror 15. Thus, the chopping mirror 15 is phase locked to the AC line. The AC line also supplies power to a high voltage power supply 28 which is used to energize the two photomultiplier tubes 21 and 27.

The output of photomultiplier tube 21 is fed into a preamplifier 29. The output of preamplifier 29 is fed into a level monitor 30 and also back to the high voltage power supply 28 so that the DC output level of the photomultiplier tube 21 remains constant. A meter 31 monitors the output of the high voltage power supply 28. An AC output from the photomultiplier tube 21 indicates a guiding error. The output of the preamplifier 29 is also fed into two electronic channels, one used in connection with right ascension errors and the other used in connection with declination errors.

The declination error channel includes a demodulator 32 and a filter 33. The output of the preamplifier 29 is fed into the demodulator 32 which is also connected to the AC line. The filter 33 removes any AC components present in the output of the demodulator 32. The output of the filter 33 is a DC signal in which the polarity indicates the direction of the error (north-south) and the magnitude indicates the magnitude of the error.

The right ascension error channel also includes a demodulator 34 and a filter 35 corresponding to demodulator 32 and filter 33. However, the demodulator 34 is coupled to the AC line through a 90° phase shift 36 so that the output of filter 35 indicates errors in quadrature (east-west).

The outputs of filters 33 and 35 may either be read on indicators or fed into servosystems used to drive the telescope 11 to compensate for the errors. In FIG. 3 a DC type servosystem is shown for each channel. Each servosystem includes a DC servoamplifier 37 and 38 respectively and a DC servomotor 39 and 41 respectively. Other servosystems such as AC or pulse type may also be used.

The output of photomultiplier tube 27 is fed into a preamplifier 42 whose output is fed into a demodulator 43. The output of the demodulator 43 is then passed through a filter 44 which removes any AC components that might be present. The output of the filter 44 is read on a meter 45. In addition, or as an alternative, the output of amplifier 42 may be fed into a servosystem which may comprise an AC servoamplifier 46 and an AC servomotor 47 for repositioning the optics to compensate for the focus error. Because the chopping mirror 15 is phase locked to the AC line, the AC error signal is either in phase or 180° out-of-phase depending on whether the focus occurs prior to or after the knife edge 24. An in-phase signal moves the needle 48 in one direction (i.e., to the left) and an out-of-phase signal moves the needle 48 in the other direction.

Cutoff meter 49 is used in connection with adjusting the knife edge 23 so that it passes through the center of the beam spot. The procedure for accomplishing this is as follows. With the knife edge out of the beam (and no focus or guiding errors) the cutoff meter 49 indicates the amplitude DC signal output. By mechanical means (not shown) the knife edge 23 is moved into the beam until the meter 48 indicates that the DC signal is halved. Needle 48 is then set at the null or zero position by refocusing the optical system to set the focus at the knife edge.

As is evident, the guiding portion of the apparatus is completely independent of the focusing portion. On the other hand, the focusing portion of the apparatus is not dependent on the particular guiding technique of the invention but requires that the telescope be properly aligned. If not, guiding errors will produce AC signals in the focus detector 27.

Referring now to FIG. 4, there is shown a section view of a portion of another embodiment of the invention. In this embodiment, the light beam A emerging from the telescope 11 impinges on a chopper which is in the form of a rotating mirror-coated knife edge 141. The knife edge 141 is mounted inside a hollow tubular shaft 142. The shaft 142, which rotates about its longitudinal axis Z, is mounted inside an annular gear 143 which is coupled to a high-speed synchronous motor Y through a spur gear 144. Thus, two beam M and N emerge from the chopper, one beam M being reflected by the knife edge 141 and the other beam N being passed by the knife edge 141. These two beams are used in the same manner as the two beams emerging from the beamsplitter 18 in the FIG. 1 embodiment; that is, one beam is used for sensing guiding errors and the other beam is used with a properly positioned stationary knife edge for sensing focusing errors. One advantage of this embodiment is that the chopped light is not passed through a beamsplitter. Thus, it is possible to guide and focus on stars that are fainter by one stellar magnitude.

As another alternative embodiment the beam of light passed by the knife edge 141 (i.e., not reflected) may be divided by a beamsplitter into two beams or the beam of light reflected by the knife edge may be divided into two emerging beams are used in the same way as in the FIG. 1 embodiment.

Obviously, many other alterations and modifications will become apparent to those skilled in the art. It is therefore to be understood that the scope of this invention is as defined in the appended claims.

I claim:

1. Apparatus for monitoring changes in the axial position and focus plane of an image of an object formed by an image-forming optical system, said image-forming optical system being adapted to collect light from said object and emit a beam which is converging and focusable the apparatus comprising:
   a. rotating chopping means intercepting the beam before a predetermined focus of the optical system and emitting at least one chopped portion of the beam focusable at said focus, said chopping means being centered to chop the beam in equal parts when the beam is in a predetermined axial position;
   b. beam-splitting means splitting the chopped portion of the beam before said predetermined focus into two beams emerging along different paths;
   c. a knife edge disposed in a plane through said predetermined focus of one of said split beams and adjustably positioned so as to pass through the center of said focus, changes in focus of said chopped portion of the beam causing changes in the intensity of light passed by the knife edge;
   d. first light-sensitive means for measuring the intensity of the other of said split beams; and e. second light sensitive means for measuring the intensity of that part of said one split beam that is passed by the knife edge; whereby the intensity measured by the first light-sensitive means is related to changes in the axial portion of the light beam emerging from the image-forming optical system, and the intensity measured by the second light-sensitive means is related to changes in the location of the focus plane of the image formed by the image-forming optical system.

2. The invention according to claim 1 and further including electric means for converting the output of each of said light-sensitive means into an electrical signal whose magnitude is related to the magnitude of the change and whose polarity is related to the direction of the change.

3. The invention according to claim 2 and further including servo means connected to said image-forming optical system and said electronic means for moving said image forming optical system to compensate for the changes.

4. The invention according to claim 1 and wherein said chopping means comprises a mirror having a straight edge and a motor for rotating the mirror about a point along said straight edge whereby the light emitted by the chopping means comprises a single beam.

5. Apparatus for monitoring changes in the axial position and focus plane of an image of an object formed by an image-forming optical system, said image-forming optical system being adapted to collect light from said object and emit a beam which is converging and focusable, the apparatus comprising:

a. rotating chopping means intercepting the beam before a predetermined focus of the optical system and emitting two chopped beam portions along different paths, said chopping means being centered to chop the beam in two equal portions when the beam is in a predetermined axial position;

b. a knife edge disposed in a plane through said predetermined focus of one of said chopped beam portions and adjustably positioned so as to pass through the center of said focus, changes in focus of said chopped portion of the beam causing changes in the intensity of light passed by the knife edge;

c. first light-sensitive means for measuring the intensity of the other of said chopped beam portions; and d. second light-sensitive means for measuring the intensity of that part of said one chopped beam portion that is passed by the knife edge;

whereby the intensity measured by the first light-sensitive means is related to changes in the axial portion of the light beam emerging from the image-forming optical system, and the intensity measured by the second light-sensitive means is related to changes in the location of the focus plane of the image formed by the image-forming optical system.

6. The invention according to claim 5 and wherein said chopping means comprises a disc made up of a semicircular reflective portion and a semicircular transparent portion and wherein light emitted by the chipping means comprises two converging focusable beams.